US010936442B2

(12) United States Patent
Srinivasan et al.

(10) Patent No.: US 10,936,442 B2
(45) Date of Patent: Mar. 2, 2021

(54) SIMULTANEOUS FILE LEVEL RECOVERY FROM MULTIPLE BACKUPS USING A PROXY VIRTUAL MACHINE (71) Applicant: EMC IP Holding Company LLC, Hopkinton, MA (US)

(72) Inventors: Sharath Talkad Srinivasan, Bengaluru (IN); Paloth Parambil Shahid, Calicut (IN)

(73) Assignee: EMC IP Holding Company LLC, Hopkinton, MA (US)

(*) Notice: Subject to any disclaimer, the term of this patent is extended or adjusted under 35 U.S.C. 154(b) by 279 days.

(21) Appl. No.: 16/029,368

(22) Filed: Jul. 6, 2018

(65) Prior Publication Data

US 2020/0012574 A1 Jan. 9, 2020

(51) Int. Cl.
*G06F 17/00* (2019.01)
*G06F 11/14* (2006.01)
*G06F 9/455* (2018.01)
*G06F 16/16* (2019.01)
*G06F 16/178* (2019.01)

(52) U.S. Cl.
CPC ...... *G06F 11/1469* (2013.01); *G06F 9/45558* (2013.01); *G06F 11/1453* (2013.01); *G06F 11/1464* (2013.01); *G06F 16/168* (2019.01); *G06F 16/178* (2019.01); *G06F 2009/45579* (2013.01); *G06F 2009/45583* (2013.01); *G06F 2009/45595* (2013.01); *G06F 2201/84* (2013.01)

(58) Field of Classification Search
None
See application file for complete search history.

(56) References Cited

U.S. PATENT DOCUMENTS

| 6,948,039 | B2 * | 9/2005 | Biessener | G06F 3/0601 |
| | | | | 707/999.202 |
| 7,093,086 | B1 * | 8/2006 | van Rietschote | G06F 11/1438 |
| | | | | 711/161 |
| 8,060,476 | B1 * | 11/2011 | Afonso | G06F 11/1451 |
| | | | | 707/649 |
| 8,566,542 | B1 * | 10/2013 | Wang | G06F 11/1456 |
| | | | | 711/114 |
| 9,292,327 | B1 * | 3/2016 | von Thenen | G06F 11/1484 |
| 10,055,303 | B1 * | 8/2018 | Kumar | G06F 16/1727 |
| 10,146,471 | B1 * | 12/2018 | Samad | G06F 3/065 |
| 10,417,098 | B2 * | 9/2019 | Fruchtman | G06F 11/1469 |
| 2007/0208918 | A1 * | 9/2007 | Harbin | G06F 11/1451 |
| | | | | 711/162 |

(Continued)

*Primary Examiner* — Hasanul Mobin
(74) *Attorney, Agent, or Firm* — Staniford Tomita LLP (57) ABSTRACT

Consolidating data across several backups to a single virtual machine (VM) at a single instance. A process stores a VM to be backed up such that each backup comprises a single VM disk (VMDK). Upon request from the backup server, the deduplication system returns the location of the VMDKs as a network file system (NFS) path for each VMDK. This path entry is exported to the hypervisor hosting a proxy VM. The entry is mounted as a data store to the hypervisor. The proxy VM uses the VMDK which is in the data store and mounts the disk. This is performed for each VMDK so that the proxy VM mounts the NFS paths that is exported from the deduplication system onto a local file system of the base VM. From the local file system, it creates the mount points to become a user-searchable drive.

17 Claims, 5 Drawing Sheets

(56) References Cited

U.S. PATENT DOCUMENTS

| | | | |
|---|---|---|---|
| 2010/0049930 A1* | 2/2010 | Pershin | G06F 11/1451 711/162 |
| 2010/0070725 A1* | 3/2010 | Prahlad | G06F 11/1453 711/162 |
| 2010/0262585 A1* | 10/2010 | Rosikiewicz | G06F 16/10 707/679 |
| 2013/0262638 A1* | 10/2013 | Kumarasamy | G06F 9/5077 709/221 |
| 2014/0052692 A1* | 2/2014 | Zhang | G06F 11/1453 707/639 |
| 2017/0116088 A1* | 4/2017 | Anami | G06F 3/0643 |
| 2017/0168903 A1* | 6/2017 | Dornemann | G06F 9/45558 |
| 2017/0177454 A1* | 6/2017 | Ramasamy | G06F 11/2094 |
| 2018/0203742 A1* | 7/2018 | Antony | G06F 11/0793 |
| 2018/0373597 A1* | 12/2018 | Rana | G06F 16/907 |
| 2019/0391880 A1* | 12/2019 | Wang | G06F 11/1461 |

\* cited by examiner

SIMULTANEOUS FILE LEVEL RECOVERY FROM MULTIPLE BACKUPS USING A PROXY VIRTUAL MACHINE

TECHNICAL FIELD

Embodiments are generally directed to data backup and recovery in virtual hard disk (VHD) networks, and more specifically to performing simultaneous file level recovery from multiple backups using a proxy virtual machine.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. The advent of virtualization technology has led to the increased use of virtual machines as data storage targets. Virtual machine (VM) backup and disaster recovery systems using hypervisor platforms, such as vSphere from VMware or Hyper-V from Microsoft, among others, have been developed to provide recovery for various different needs, such as data migration, disaster recovery, regular scheduled backups (hourly, daily, etc.), and so on.

Popular backup platforms (e.g., EMC Networker) support backups, such as block based backups (BBB) of volumes and files in a virtual hard disk (VHD or VHDx) format. The files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created. A VHD is a file format that represents a virtual hard disk drive (HDD). It may contain what is found on a physical HDD, such as disk partitions and a file system, which in turn can contain files and folders.

For large-scale networks, the amount of data can be enormous and management of backup media and files is necessary to ensure timely recovery. Existing file level recovery option can recover files from only one backup at a time. If the user is not sure about the location of a particular backup file, it becomes a tedious and time consuming job to browse through all the backup one-by-one in a serial fashion. The problem can become unmanageable if the backup system runs daily backups and thus creates a lot of confusing restore points. Current backup systems use a file level restore (FLR) agent to browse the backups and present the contents to the user. In general, FLR provides a way to access individual files within a restore point, and makes it possible to read copies of files or restore them from within restore points to any other available location. However, FLR has its own processing delays, thus making it unsuitable for inspecting each backup one after the other. Also, FLR systems mount the backups directly to the production VM, which leads to the risk of data corruption.

What is needed, therefore, is a backup method that allows for simultaneous file level recovery from multiple backups.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, and Data Domain Restorer are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
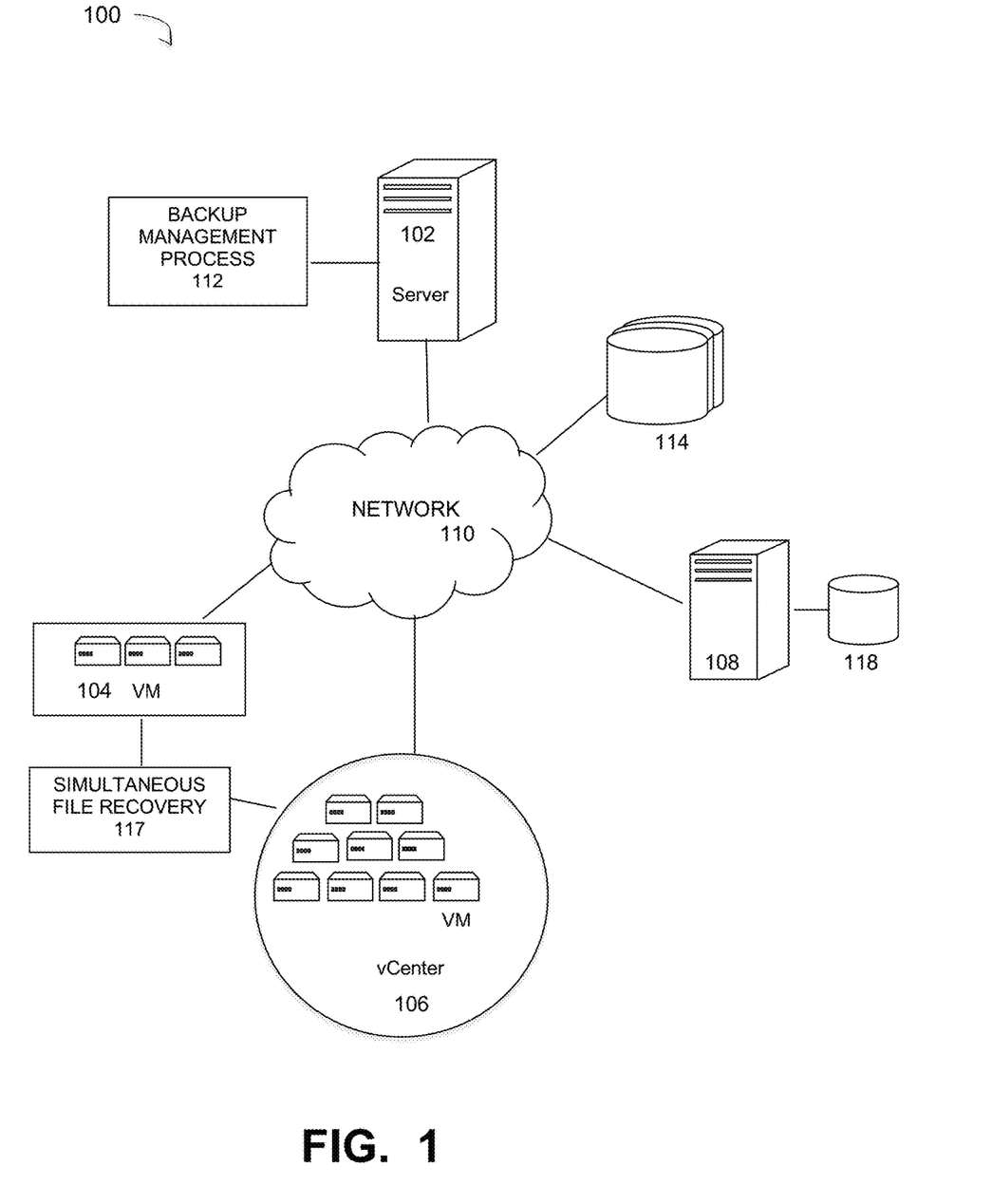
FIG. 1 is a diagram of a large-scale network implementing a simultaneous file level recovery process, under some embodiments.

FIG. 1 illustrates a computer network system 100 that implements one or more embodiments of a virtual hard disk (VHD) merging process in a Hyper-V based backup system. In system 100, a number of VMs or groups of VMs 104 are provided to serve as backup targets. Target VMs may also be organized into one or more vCenters (virtual centers) 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a server 102 that executes a backup management process 112 automates the backup of network data using the target VM devices. In an embodiment, the process 112 uses certain known full and incremental (or differencing) backup techniques along with a snapshot backup process that is used to store an image or images of the system(s) to be backed up prior to the full or incremental backup operations. In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible.

As is known, virtual machine environments utilize hypervisors (e.g., Hyper-V) to create and run the virtual machines. A computer running the hypervisor is a host machine and all virtual machines are guest machines running guest operating systems (OS). The hypervisor provides the guest operating systems with a virtual operating platform and manages the execution of the VMs. In an embodiment, the backup management process 112 is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest operating systems, typically by using an API.

In an embodiment, system 100 represents a backup platform (e.g., EMC Networker) that supports backups of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created.

FIG. 1 is a diagram of a large-scale network implementing a simultaneous file level recovery using vProxy methods, under some embodiments. The backup process 112 uses snapshot backups as a read-only copy of a volume at a particular point in time. Snapshots allow for the creation of consistent backups of a volume and ensure that contents do not change and are not locked while the backup is in progress. Snapshots are typically the first step in any incremental or full backup session. The vProxy is a proxy VM process or component and generally refers to a newer version of a VMware Backup Appliance (VBA) and supports a number of recoveries, including non-admin File Level Recovery (FLR) and Instant Access which enables immediate access to virtual machines on a Data Domain system.

The simultaneous file level recovery process 117 is executed as part of a VM 104 or vCenter 106. In an embodiment, the recovery process is initiated from the backup server 102 and the recover process runs in the vProxy. The networker server acts as an orchestrator for the entire recover workflow. Once the mount operation is completed successfully, the user is notified through an appropriate user interface (UI). Then user logs in to the target VM and does a search on the attached file system and copies the required files to the target VM. The vProxy (proxy VM) is the VM that communicates instructions from one process to another. A base VM refers to the VM that is used to build the multiple backups.

The system uses recovery points (also referred to as snapshots), which are point-in-time copies of a replica stored on the backup server 102. A replica is a complete point-in-time copy of the protected shares, folders, and files for a single volume on a protected computer. To start data protection, a full replica of the selected data must be copied to the allocated replica volume on the server. Thereafter, the replica is periodically synchronized with changes to the protected data. Recovery points of each replica in a protection group are created according to a specified schedule. A user can access the recovery points to recover previous versions of files in the event of data loss or corruption.

To overcome the above mentioned disadvantages, the recovery process 117 is designed such that a user can mount a number (e.g., up to 60) restore or recovery points to a non-production VM at the same time and quickly browse/search through all of these recovery points as if using a local machine.

Embodiments of the file-level recovery process make use of certain technologies, such as NFS (network file system) data store mount on ESXi, Instant Recover (IR) technology in EMC Networker products, where the backup data in Data Domain is exported as an NFS file share, and FLR mount operations. Data may be stored using the VMDK (Virtual Machine Disk) file format that describes containers for virtual hard disk drives used in the VMs. In general, NFS is a client/server application that allows a user to view and store/update files on a remote computer as though on a local computer.

In an embodiment, the simultaneous file-level backup recovery process is implemented in a Networker VMware protection system using vProxy appliances. For this embodiment, VMware ESXi technology is used. This is an enterprise-class, type-1 (bare-metal) hypervisor for deploying and serving virtual computers, and includes and integrates OS components, such as a kernel. ESXi can access a designated NFS volume located on an NAS server, mount the volume, and use it for its storage needs. It can use NFS volumes to store and boot virtual machines in the same way as VMFS datastores. It supports shared storage capabilities on NFS volumes, such as vMotion, ISO images, and VM snapshots.

Figure 2:
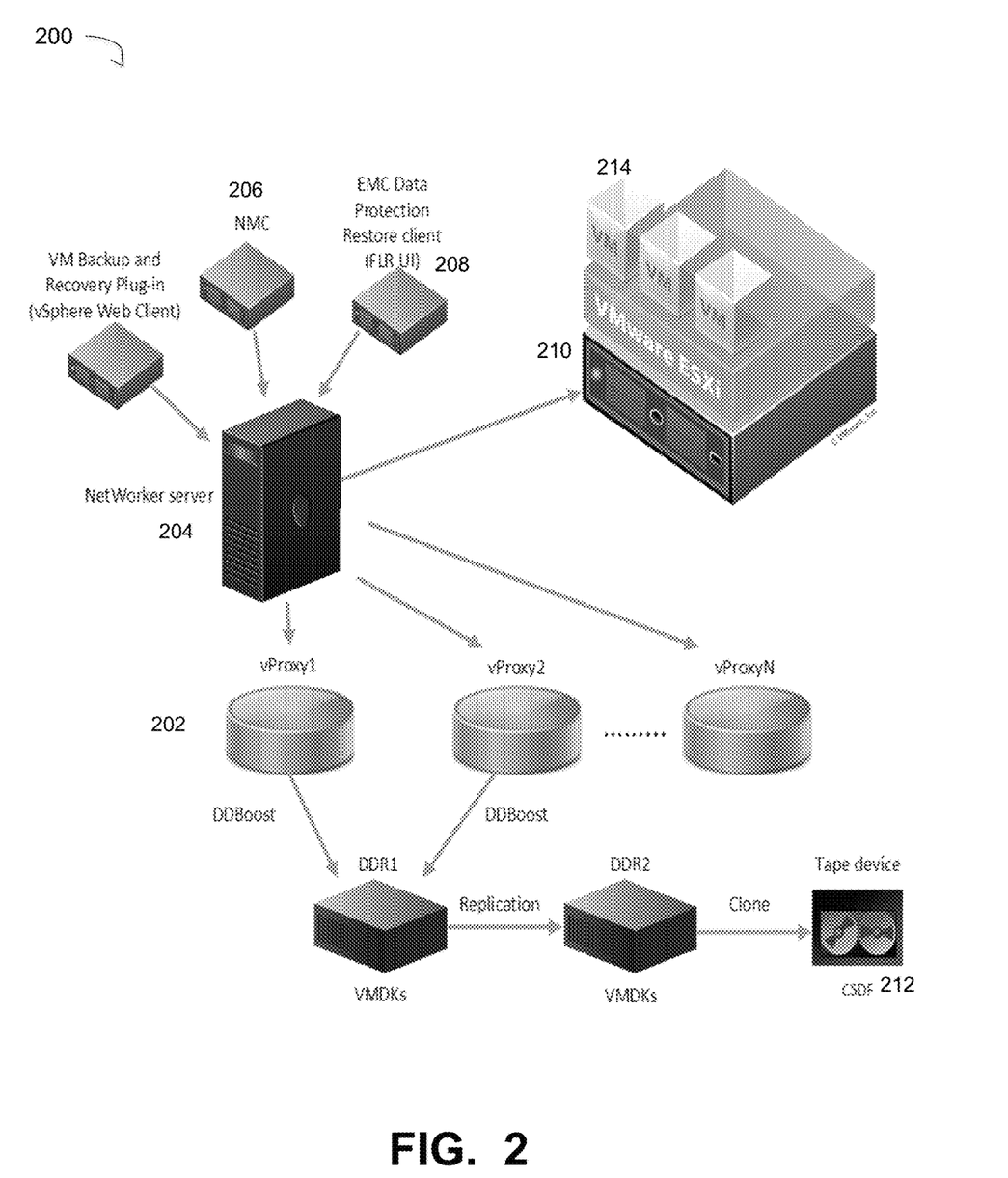
FIG. 2 illustrates a Networker VMware protection system using vProxy appliances executing a file-level restore process, under some embodiments.

FIG. 2 illustrates a Networker VMware protection system using vProxy appliances executing a file-level restore process, under some embodiments. For system 200 of FIG. 2, the vProxy appliances 202 provide the data movement services between the VMware host 210 and the target protection storage, for example Data Domain. The NetWorker server 204 provides the ability to manage vProxy appliances 202, and configure data protection policies for backup and clone operations. It integrates with the file-level restore (FLR) to provide centralized management in a virtual environment. The NMC server 206 provides the ability to start, stop, and monitor data protection policies and perform recovery operations. The EMC Data Protection Restore client UI 208 provides the ability to perform file level recovery (FLR) by using a web interface for the user. The DDR1 and DDR2 Data Domain appliances receive and clone backup data in SSDF format, and tape device 212 is the storage media that receives backup data in CDSF (CD file system) format, in an example implementation. Server 210 runs the VMware ESXi process that maintains and controls the virtual machines 214. The simultaneous file-level restore process is initiated by the backup server 204, vProxy mounts (in which all the processes run) sources the VM disk to the base VM, which is built with only a boot volume. These VMs all reside on the vCenter server 210. After the mount completes, the required files are copied from the base VM to the source VM via the network.

In an embodiment, the virtual disks in each backup is hot-added to virtual machines 214 and mount points are created for these disks. Each virtual disk consumes one slot on the vSCSI controller. In a typical implementation, a total of 15 disk per controller is supported. For an embodiment in which each virtual machine supports four vSCSI controllers, a total of 4×15=60 disks/backups can be mounted at a time. This illustrates one capacity example of a file-level recovery process, and other capacities are also possible depending on system configuration. For example, in a typical present configuration of system 200, the maximum number of NFS mounts on the ESX is 256. The maximum number of SCSI controllers in a VM is 4 Controllers and 15 disks each. The maximum number of mount points allowed in the guest VM (Linux/Windows) is thus 60. These numbers are based on the certain VMware limitations, so that the maximum number of backups which can be recovered on a single instance is up to 60, but this also depends on the number of disks in each backup. As system capacities increase, the process 117 can scale up to handle more than 60 backups.

Figure 3:
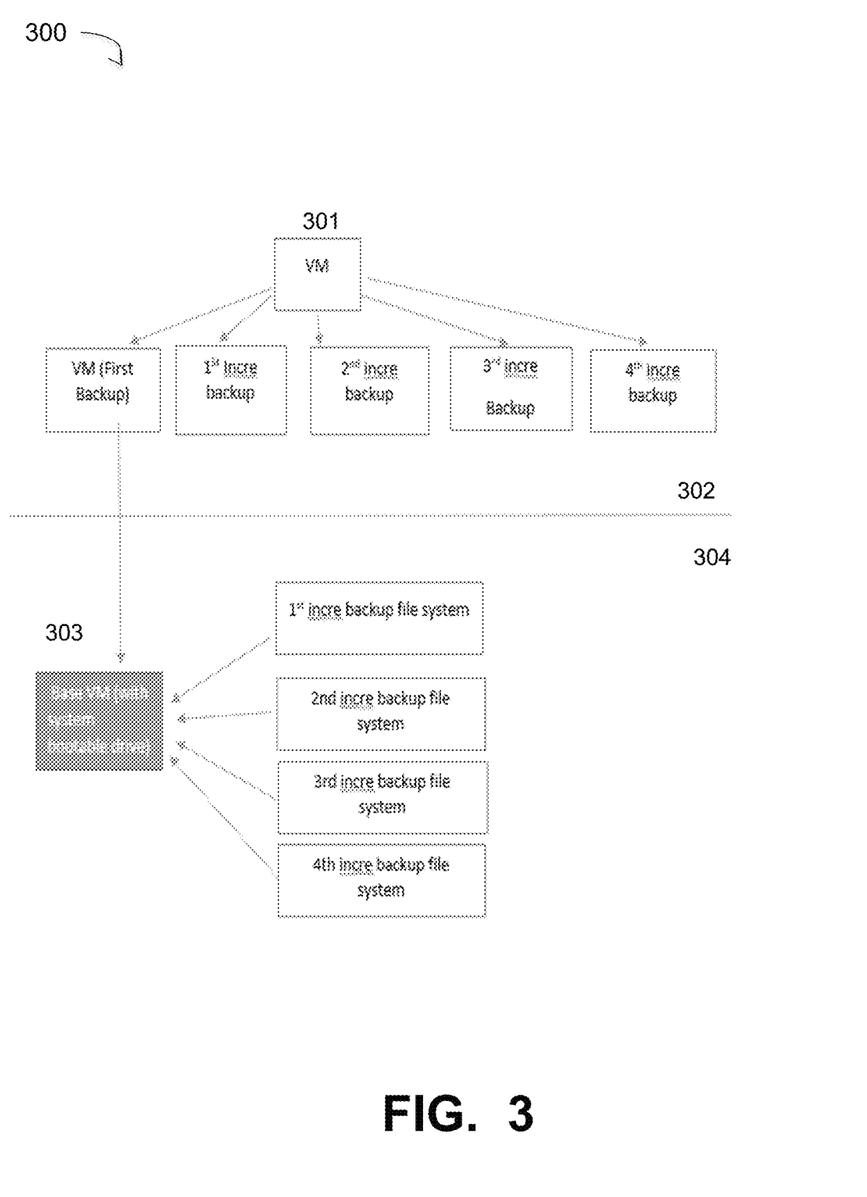
FIG. 3 illustrates the function of the simultaneous file-level recovery for multiple backups, under some embodiments.

FIG. 3 illustrates the function of the simultaneous file-level recovery for multiple backups, under some embodiments. As shown in diagram 300 of FIG. 3, incremental backups of VM 301 are taken using known incremental backup methods. For the example embodiment of FIG. 3, a first VM backup is followed by 4 incremental backups 302 denoted 1st, 2nd, 3rd, and 4th incremental backups. A base VM 303 is then built with only bootable drive intact using instant recovery (IR) technology. As soon as the recover request comes, a new VM with only bootable disks is created using an instant restore (IR) process This is a normal image restore workflow (IR makes it fast) and once it powers on, then the set of backup disks are attached to this VM. The incremental backups 304 are creating using the IR technology and then mounted as a file system on to the base VM 303. Collectively, a super VM will be built on the base VM file system with incremental VM file systems attached to it. In general, the vProxy or proxy VM is different from base VM. The vProxy is the VM on which restore processes runs, and the base VM is where the backup gets mounted (as done by vProxy) for the read.

In an embodiment, the proxy VM (vProxy) comprises a minimum resource VM defined by a template and contains an OS boot disk and subsequent disks that are backups mounted by the process 117. The Proxy VM can be configured as required. The Proxy VM can be accessed through appropriate UI tools and search functions.

Figure 4:
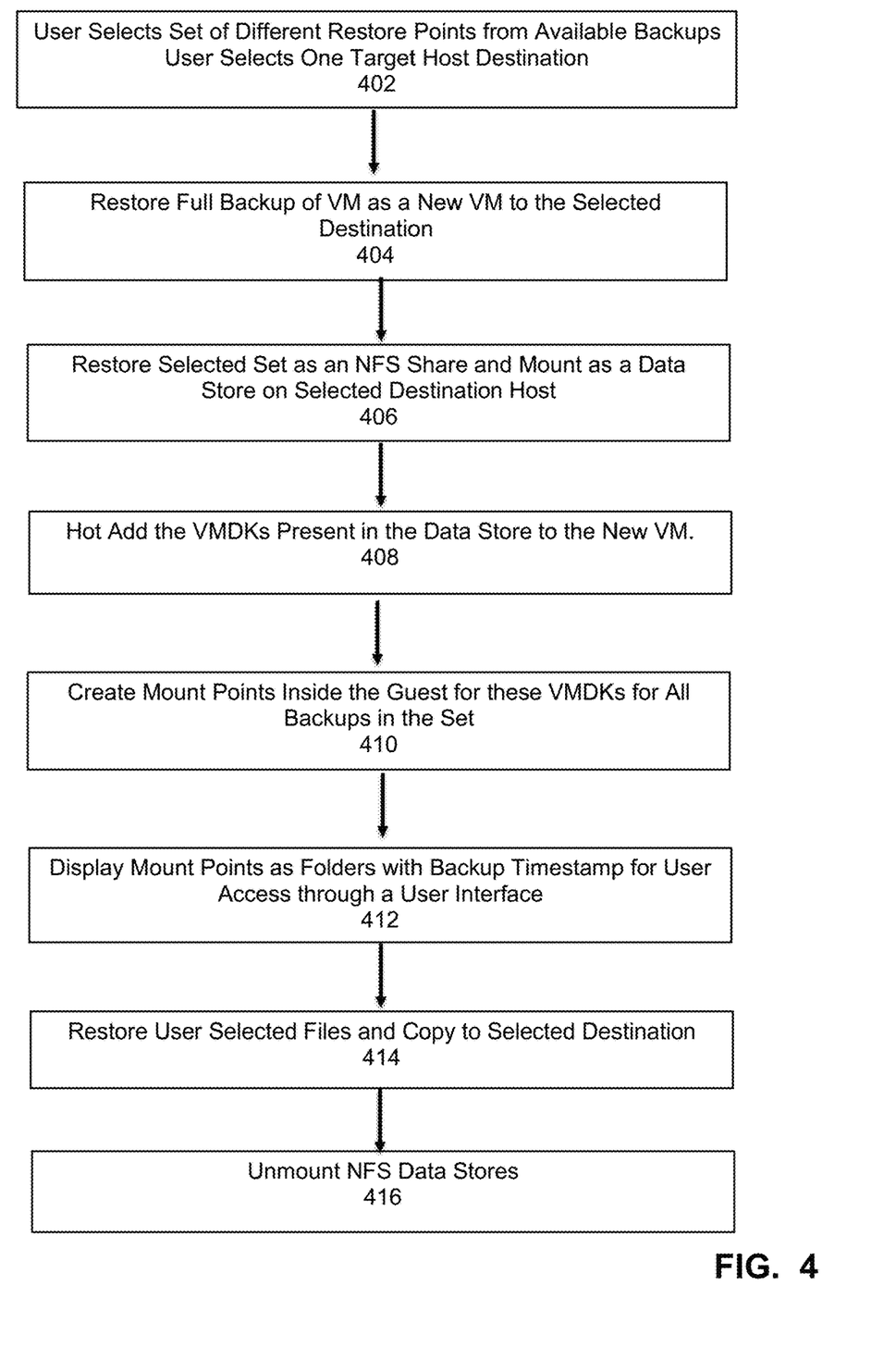
FIG. 4 is a flowchart illustrating a method of performing simultaneous file-level recovery for multiple backups, under some embodiments.

FIG. 4 is a flowchart illustrating a method of performing simultaneous file-level recovery for multiple backups, under some embodiments. As shown in flow process of FIG. 4, the process starts by the user selecting a set of different restore points out of all available backups of a VM, 402. In this step the user also selects a target host destination. A full backup of this VM is restored as a new VM to the selected destination, 404. Only the boot volume of this machine is used in the restore. This restore follows IR procedures, which typically execute very quickly (e.g., on the order of 30 seconds or less). After the VM boots up, the first backup from the selected set (from step 402) is exported from DD as an NFS share and mounted as a data store on the selected destination host, 406. The VMDK's present in this data store are hot-added to the newly created VM, 408. The available SCSI slots may be verified before this step and additional SCSI controllers are added on the fly if required. Mount points are then created inside the guest for these disks, 410. All the backups in the set are mounted like this. The user can now login to this machine and these mount points are displayed as folders with backup timestamp which can be explored by clicks or search feature in an appropriate user interface (UI), 412. The user is provided with a unified view of all the backups in the set and can navigate through them easily and quickly as local filesystem. The user can then select the file or files to be restored from "backups" all together and copy to desired destination, 414. Once the restore is complete, an unmount is performed with the option to keep the VM running or terminated. All NFS data stores are unmounted and deleted from the ESXi, 416.

The process of FIG. 4 enables the backup system to consolidate the data across several backups on to a single VM at a single instance of time. The overall process comprises storing the VM to be backed up (in VMDK format) in the Data Domain system such that each backup comprises a single VMDK, which is deduplicated (e.g., five backups equals five VMDKs). In response to a request from the backup server, the Data Domain system returns the location of the VMDKs as an NFS path for each VMDK. This NFS path entry is exported to the ESXi hosting the proxy VM (hypervisor). The entry is mounted as a data store to the ESXi first, where the data store contains the disks. The proxy VM uses the VMDK which is in the data store and mounts the disk. This is performed for each VMDK so that eventually the proxy VM mounts the NFS paths that is exported from the Data Domain system onto the local file system of the base VM, and from the local file system, it creates the mount points, which eventually becomes the drive that the user can browse through.

Although embodiments have been described with respect to network backup comprising certain specific technologies, such as Hyper-V servers, and certain backup agents or processes, it should be noted that embodiments are not so limited, and that other backup systems and methods may also utilize the single-step differencing disk merge methods described herein.

As described above, in an embodiment, system 100 includes a single-step merging process that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 5:
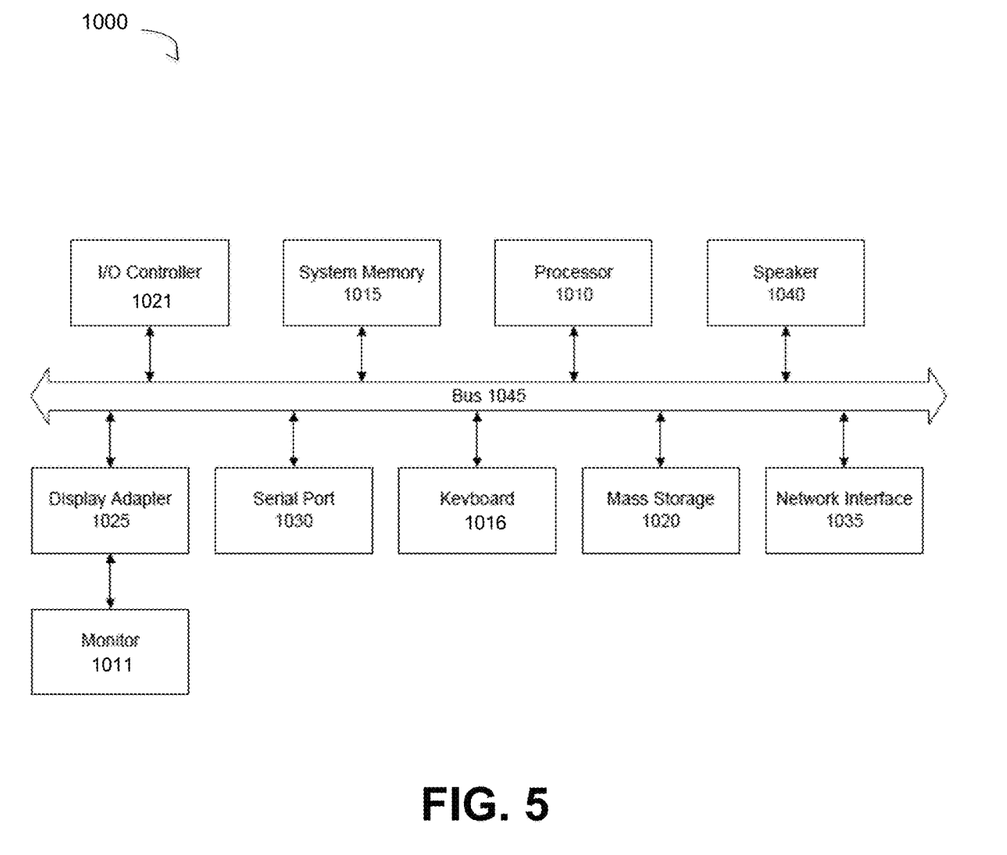
FIG. 5 is a block diagram of a computer system used to execute one or more software components of a system for simultaneous file level recovery using vProxy, under some embodiments.

FIG. 5 is a block diagram of a computer system used to execute one or more software components of a system for simultaneous file-level recovery for multiple backups, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 7 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of consolidating data across several backups onto a single virtual machine (VM) for user access, comprising:

storing a VM containing data to be backed up in a virtual machine disk format (VMDK) in a deduplication backup system such that each backup comprises a single VMDK;

in response to a request from a backup server, returning the location of the VMDKs as a network file system (NFS) path for each VMDK;

mounting each NFS path entry for each VMDK as a data store to a VM hypervisor; wherein the data store contains the disks;

exporting the NFS path entry to the VM hypervisor hosting a proxy VM;

for each VMDK, mounting by the proxy VM, the associated NFS paths exported from the deduplication backup system onto a local file system of the proxy VM to generate mounted backups; wherein the proxy VM comprises a minimum resource VM defined by a template and containing an operating system boot disk and subsequent VM disks that comprise the mounted backups; and creating a searchable disk or folder containing the VMDKs for access by a user through a user interface.

2. The method of claim 1 further comprising using snapshot backups as recovery points to create point-in-time copies of a replica of the data to be backed up on the backup server.

3. The method of claim 2 wherein the replica comprises a complete point-in-time copy of the protected shares, folders, and files for a single volume on a protected computer.

4. The method of claim 3 further comprising, to start a data protection process, copying a full replica of selected data must to an allocated replica volume on the backup server.

5. The method of claim 4 further comprising periodically synchronizing the full replica with changes to the protected data.

6. The method of claim 5 wherein the recovery points of each replica in a protection group are created according to a specified schedule to allow a user to access the recovery points to recover previous versions of files in the event of data loss or corruption.

7. The method of claim 1 wherein each subsequent VM disk is hot added to a set of VMs as mount points are created for each of these VM disks.

8. The method of claim 7 further comprising assigning each VM disk to one slot in a vSCSI controller.

9. A computer-implemented method of performing simultaneous file level recover (FLR) for multiple backups, comprising:

receiving a user selection of a set of different restore points out of available backups of a virtual machine (VM) along with a selected target destination;

restoring, using an instant recover (IR) process, a full backup of the VM as a proxy VM to the selected target destination using only a boot volume of the VM;

exporting, after the VM boots up, a first backup from the selected set from a deduplication system as a network file system (NFS) share for mounting as a data store on the selected target destination;

dynamically adding VM disks (VMDKs) present in the data store to the proxy VM;

simultaneously creating mount points are then created inside a guest operating system for the VMDKs;

displaying the created mount points as folders for access to a user through a user interface; and displaying the mount points with a respective backup timestamp to facilitate searching by the user for specific restore points through a browse feature of the user interface.

10. The method of claim 9 further comprising:

receiving a user request to restore one or more files to a desired destination;

unmounting, in response to the user request, a corresponding VMDK containing the one or more files; and providing an option to terminate or keep the unmounted VM running.

11. The method of claim 9 wherein the proxy VM comprises a minimum resource VM defined by a template and containing an operating system boot disk and subsequent VM disks that comprise the added VMDKs.

12. The method of claim 9 further comprising using snapshot backups as the restore points to create point-in-time copies of a replica of the data of the available backups, wherein the replica comprises a complete point-in-time copy of the protected shares, folders, and files for a single volume on a protected computer.

13. The method of claim 12 further comprising:

copying a full replica of selected data must to an allocated replica volume on the backup server; and periodically synchronizing replica with changes to the protected data.

14. A system for consolidating data across several backups onto a single virtual machine (VM) for user access, comprising:

a memory storage unit storing a VM containing data to be backed up in a virtual machine disk format (VMDK) in a deduplication backup system such that each backup comprises a single VMDK;

an interface receiving a response to a request from a backup server, and in response, returning the location of the VMDKs as a network file system (NFS) path for each VMDK;

a processing component mounting each NFS path entry for each VMDK as a data store to a VM hypervisor; wherein the data store contains the disks, exporting the NFS path entry to the VM hypervisor hosting a proxy VM, and for each VMDK, mounting by the proxy VM, the associated NFS paths exported from the deduplication backup system onto a local file system of the proxy VM to generate mounted backups, wherein the proxy VM comprises a minimum resource VM defined by a template and containing an operating system boot disk and subsequent VM disks that comprise the mounted backups; and a user interface creating a searchable disk or folder containing the VMDKs for access by a user through a searchable programming component of the user interface.

15. The system of claim 14 wherein the system uses snapshot backups as the restore points to create point-in-time copies of a replica of the data of the available backups, wherein the replica comprises a complete point-in-time copy of the protected shares, folders, and files for a single volume on a protected computer.

16. The system of claim 15 further comprising a copy component copying a full replica of selected data must to an allocated replica volume on the backup server, and periodically synchronizing the full replica with changes to the protected data.

17. The system of claim 14 wherein each subsequent VM disk is hot added to a set of VMs as mount points are created for each of these VM disks, and wherein each VM disk is added to one slot in a vSCSI controller.

* * * * *